United States Patent
Vandyke et al.

(10) Patent No.: US 12,013,071 B2
(45) Date of Patent: Jun. 18, 2024

(54) DUCTS COMPRISING EXOSKELETON AND SOUND-ABSORBING STRUCTURES AND VEHICLES USING SUCH DUCTS

(71) Applicant: The Boeing Company, Chicago, IL (US)

(72) Inventors: Bryce A. Vandyke, Snohomish, WA (US); Douglas D. Maben, Snohomish, WA (US); Dale Hastings, Snohomish, WA (US); Mark M. Gmerek, Clinton, WA (US); Xin Han, Bothell, WA (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 17/373,453

(22) Filed: Jul. 12, 2021

(65) Prior Publication Data

US 2023/0010222 A1 Jan. 12, 2023

(51) Int. Cl.
*F16L 55/033* (2006.01)
*B64D 13/06* (2006.01)
(Continued)

(52) U.S. Cl.
CPC .......... *F16L 55/0336* (2013.01); *B64D 13/06* (2013.01); *F16L 55/0338* (2013.01);
(Continued)

(58) Field of Classification Search
CPC . F16L 55/0336; F16L 55/0338; F16L 55/035; F16L 55/0335; F16L 11/08;
(Continued)

(56) References Cited

U.S. PATENT DOCUMENTS 1,006,640 A * 10/1911 Faget ............................. 138/137
2005/0067038 A1 3/2005 Kobayashi et al.
(Continued)

FOREIGN PATENT DOCUMENTS

CN 210861664 U 6/2020
DE 202011106410 U1 * 4/2012 ............. B65G 53/24
(Continued)

OTHER PUBLICATIONS

English translation of DE-202011106410-U1, dated Jul. 27, 2023 (Year: 2023).*

(Continued)

*Primary Examiner* — Edelmira Bosques
*Assistant Examiner* — Brett Peterson Mallon
(74) *Attorney, Agent, or Firm* — Jordan IP Law, LLC

(57) ABSTRACT

Described herein are noise attenuating ducts and vehicles using these ducts for environmental control systems. A duct comprises an exoskeleton structure and a sound-absorbing structure, disposed within and conforming to the exoskeleton structure. The exoskeleton structure provides external mechanical support to the sound-absorbing structure thereby helping to maintain the tubular shape of the sound-absorbing structure. This external support does not interfere with the airflow inside the sound-absorbing structure. Furthermore, the external positioning of the exoskeleton structure allows the integration of various support mounting features for the installation of the duct in a vehicle. In some examples, the exoskeleton structure comprises a plurality of enclosed openings to reduce the weight of the exoskeleton structure and provide additional flexibility. Furthermore, additive manufacturing of the exoskeleton structure allows achieving a monolithic structure with various features and characteristics described above.

14 Claims, 13 Drawing Sheets

(51) Int. Cl.
   *F16L 55/035* (2006.01)
   *F24F 13/02* (2006.01)
(52) U.S. Cl.
   CPC ........ *F16L 55/035* (2013.01); *F24F 13/0263* (2013.01); *B64D 2013/0603* (2013.01)
(58) Field of Classification Search
   CPC ...... F16L 11/112; F16L 59/022; F16L 59/021; F16L 55/172; F16L 9/18; F16L 9/21; F16L 11/26; F16L 55/02; F16L 55/033; B64D 13/06; B64D 2013/0603; F24F 13/0263
   See application file for complete search history.

(56) References Cited

U.S. PATENT DOCUMENTS

| | | | |
|---|---|---|---|
| 2017/0219136 A1* | 8/2017 | Merheb | ..................... F16L 9/21 |
| 2018/0058771 A1 | 3/2018 | Butcher, Jr. et al. | |
| 2019/0263050 A1 | 8/2019 | Napp | |
| 2020/0056727 A1 | 2/2020 | Maben et al. | |
| 2020/0056803 A1* | 2/2020 | Vandyke | ................... B32B 5/18 |

FOREIGN PATENT DOCUMENTS

| | | | |
|---|---|---|---|
| DE | 102014224978 A1 * | 6/2016 | |
| RU | 2013100478 A | 7/2014 | |
| WO | 2020126212 A1 | 6/2020 | |

OTHER PUBLICATIONS

English translation of DE-102014224978-A1, dated Jul. 27, 2023 (Year: 2023).*
Extended European Search Report for application 22177681.8 dated Nov. 22, 2022, 16 pages.
Communication pursuant to Article 94(3) for European Application No. 22177681.8, dated Apr. 30, 2024, 23 pages.

* cited by examiner

DUCTS COMPRISING EXOSKELETON AND SOUND-ABSORBING STRUCTURES AND VEHICLES USING SUCH DUCTS

BACKGROUND

Many types of vehicles, such as aircraft, utilize environmental control systems to provide treated air to the passengers and/or cargo. For example, an environmental control system can supply air at a set temperature and/or a set flow rate to each passenger. Furthermore, an environmental control system can remove particles and other pollutants from the incoming air before supplying the clean air to the destination. An environmental control system typically includes various ducts to flow the air through the vehicle. However, the airflow within these ducts generates noise, which can be undesirable, especially when these ducts are positioned close to or inside the passenger cabins. Various special-purpose noise-attenuating components, such as zone mufflers, have been used to reduce the noise level. However, these additional special-purpose components increase the vehicle weight, occupy additional space, and raise the total system cost. Furthermore, supporting ducts within vehicles typically require additional components.

What is needed are new types of ducts with in-situ noise attenuating capabilities that reduce and/or eliminate the need for additional noise attenuating components. In addition, it is desired to provide ducting having reduced weight, more compact size, and high levels of system modularity.

SUMMARY

Described herein are noise attenuating ducts and vehicles using these ducts for environmental control systems. Also provided are methods of manufacturing these ducts. A duct comprises an exoskeleton structure and a sound-absorbing structure, disposed within and conforming to the exoskeleton structure. The exoskeleton structure provides external mechanical support to the sound-absorbing structure thereby maintaining the tubular shape of the sound-absorbing structure. This external support does not interfere with the airflow inside the sound-absorbing structure. Furthermore, the external positioning of the exoskeleton structure provides an option for integrating various support mounting features into the exoskeleton structure. These features are used for the installation of the duct in a vehicle. This integration reduces the number of different components in a duct, reducing the overall complexity and installation time. Specifically, additive manufacturing of the exoskeleton structure allows this integration into one monolithic structure and providing various features and characteristics further described below. In some examples, the exoskeleton structure comprises a plurality of enclosed openings to reduce the weight of the exoskeleton structure and/or to provide additional flexibility to the duct.

DETAILED DESCRIPTION

In the following description, numerous specific details are outlined to provide a thorough understanding of the presented concepts. In some examples, the presented concepts are practiced without some or all of these specific details. In other examples, well-known process operations have not been described in detail to unnecessarily obscure the described concepts. While some concepts will be described in conjunction with the specific examples, it will be understood that these examples are not intended to be limiting.

Introduction

Figure 1:
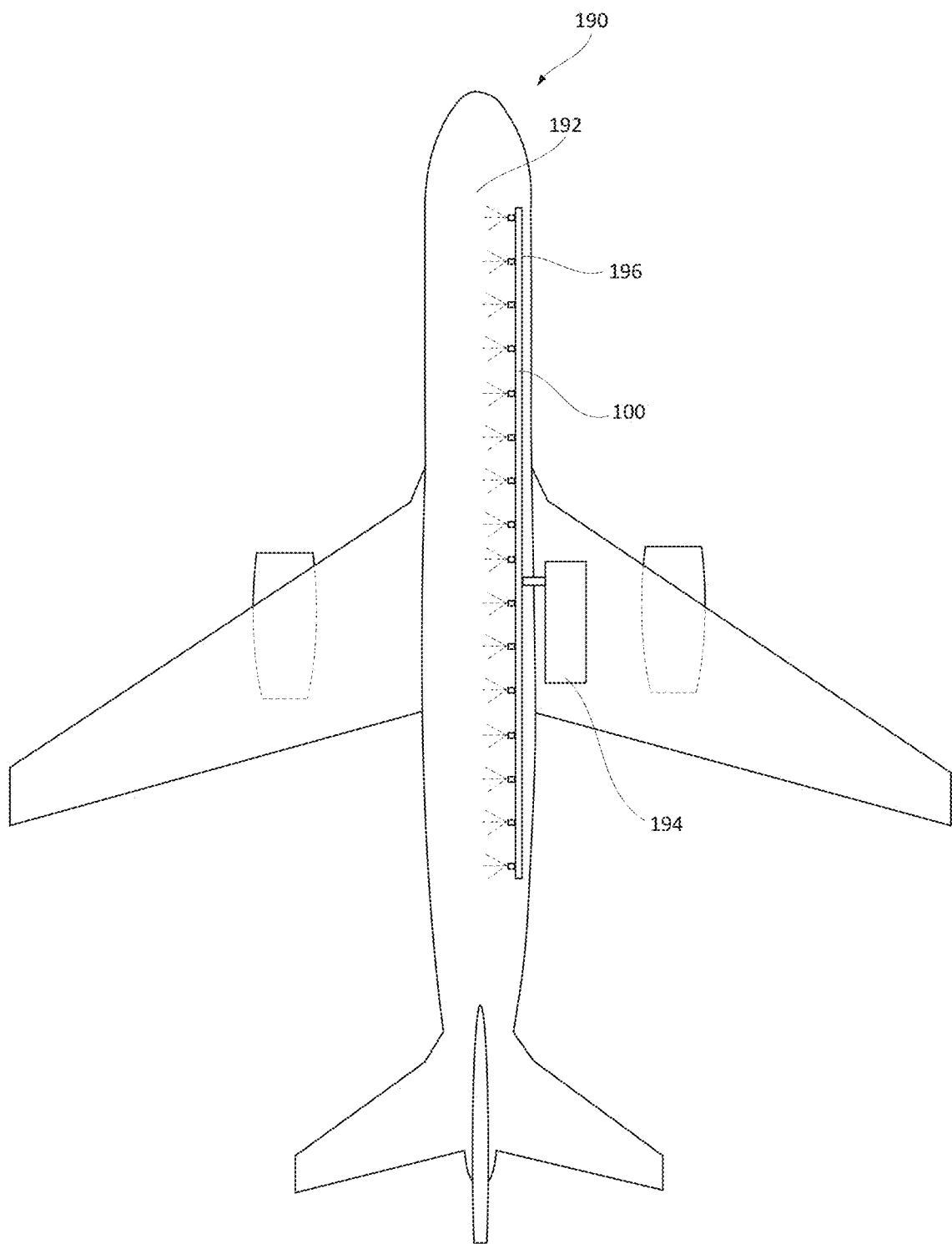
FIG. 1 is a schematic illustration of an aircraft comprising an environmental control system that utilizes ducts for supplying treated air to various portions of the aircraft, in accordance with some examples.

An environmental control system (ECS) can be used on a vehicle to control the temperature, humidity, and/or other environmental conditions of the vehicle interior, such as a passenger compartment, cargo compartment, and the like. FIG. 1 is a schematic illustration of one example of vehicle 190, which is an aircraft. However, other types of vehicles are also within the scope of this disclosure. Vehicle 190 comprises cabin 192, used by passengers and crew. Vehicle 190 also comprises ECS unit 194, used for controlling the environmental conditions within cabin 192. Specifically, ECS unit 194 is used to treat air, e.g., recycled from cabin 192 and/or obtained from the external environment. Some examples of this air treatment include, but are not limited to, heating, cooling, filtering, adjusting humidity, and the like. In some examples, ECS unit 194 is positioned away from cabin 192, e.g., in the wing areas of the aircraft, and is fluidically coupled with cabin 192 by duct system 196. This positioning of ECS unit 194 allows utilizing other components and systems of vehicle 190 (e.g., for power) and reducing the noise level within cabin 192 during operation of ECS unit 194.

Referring to FIG. 1, duct system 196 extends from ECS unit 194 to cabin 192. Duct system 196 also extends throughout cabin 192 to ensure the desired distribution of air within cabin 192. For example, passengers can control this air distribution using individual vents connected to duct system 196, e.g., each passenger has a dedicated vent that controls the flow of air from duct system 196 to this passenger.

In some examples, duct system 196 comprises or, more specifically, is assembled using multiple individual ducts 100. Individual ducts 100 are interconnected to form duct system 196 and also connected to various other components, e.g., ECS unit 194, air vents, and the like. This modular approach helps with the installation of duct system 196. Furthermore, the same type of duct 100 can be used for different portions of duct system 196 and even for different vehicles. Ducts 100 are connected and supported by various structural components of vehicle 190.

Ducts 100 are specifically designed to provide noise attenuation as the air flows through duct system 196 from ECS unit 194 to cabin 192. As such, ducts 100 can also be referred to as noise-attenuating ducts. These noise attenuation characteristics are achieved by a specific structure of ducts 100. For example, each duct comprises an exoskeleton structure and a sound-absorbing structure, disposed within the interior of the exoskeleton structure and conforming to the exoskeleton structure. The exoskeleton structure provides external mechanical support to the sound-absorbing structure, e.g., to maintain the tubular shape of the sound-absorbing structure. The sound-absorbing structure forms an enclosure for the air flowing through the duct and also provides the overall noise attenuation due to the specific design of the sound-absorbing structure.

Overall, duct designs described herein provide one-piece, additively manufactured exoskeleton structures coupled to sound-absorbing structures (for insulation, noise attenuation/self-muffling). In some examples, exoskeleton structures comprise built-in (integrated/monolithic) support brackets. These designs provide for average weight savings from about 5 kilograms to about 20 kilograms or, more specifically, from about 5 kilograms to about 10 kilograms per aircraft depending on the aircraft size, configuration, and design. In addition, the total assembly part count is reduced by at least 50% or at least 55% with these duct designs, e.g., by eliminating separate fasteners. In some examples, approximately 30 to 50 work-hours are saved by these designs (enabled, in part, by additive manufacturing) and/or use of single-pass manufacturing and snap-on exoskeleton sleeve with integrated attachment features (e.g., push-in screws). Furthermore, moisture barriers have been moved from the internal position (in conventional ducts) to the external position (e.g., as external membrane 130), thereby improving the overall protection.

Duct Examples

Figure 2A:
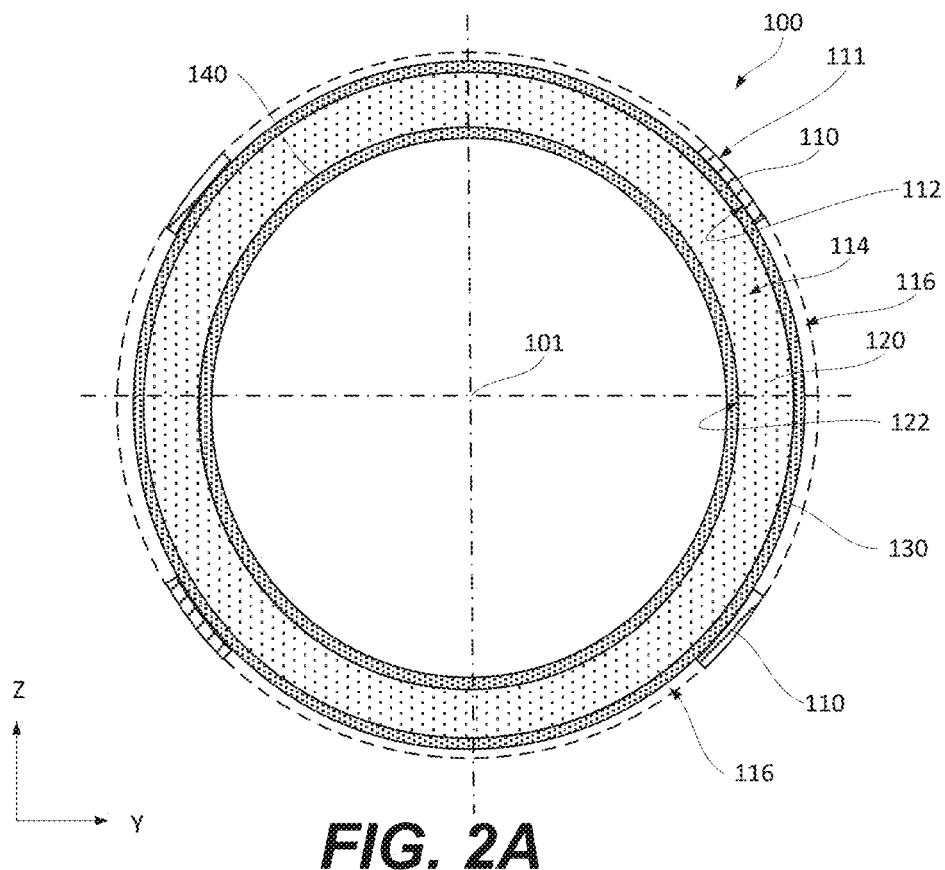
FIG. 2A is a schematic cross-sectional view of a duct, showing various internal components and features of the duct, in accordance with some examples.
Figure 2B:
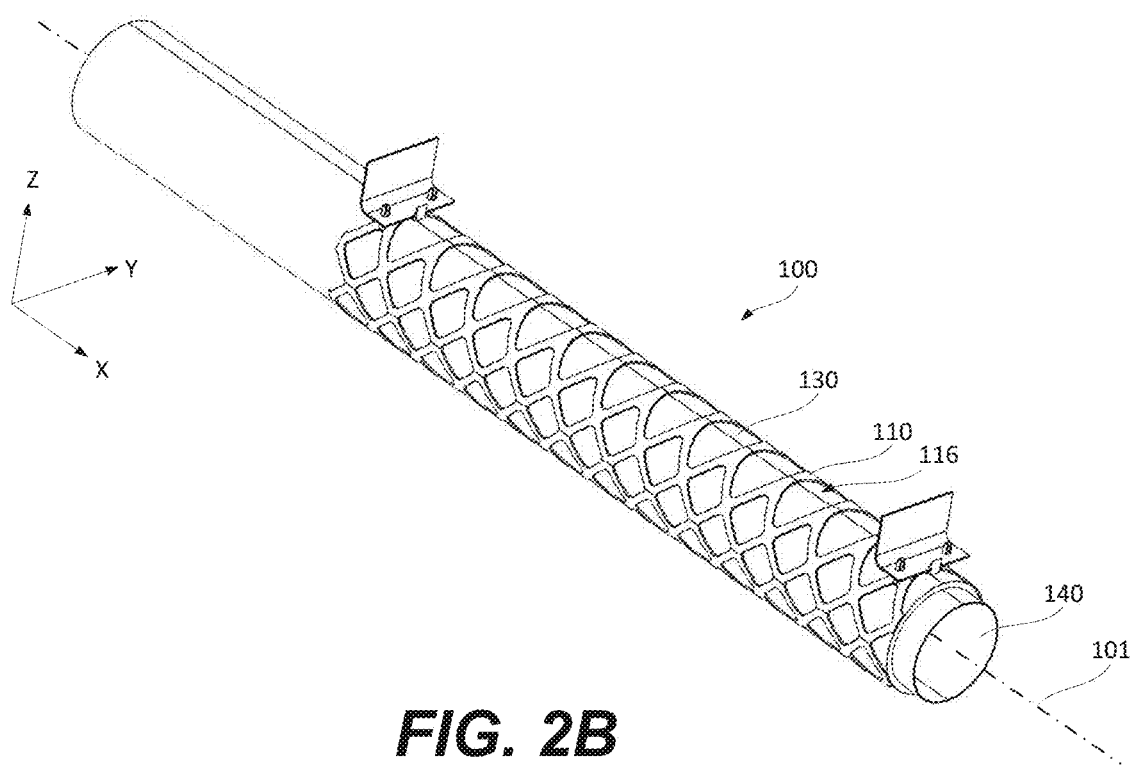
FIG. 2B is a schematic perspective view of a duct, showing various external components and features of the duct, in accordance with some examples.
Figure 2C:
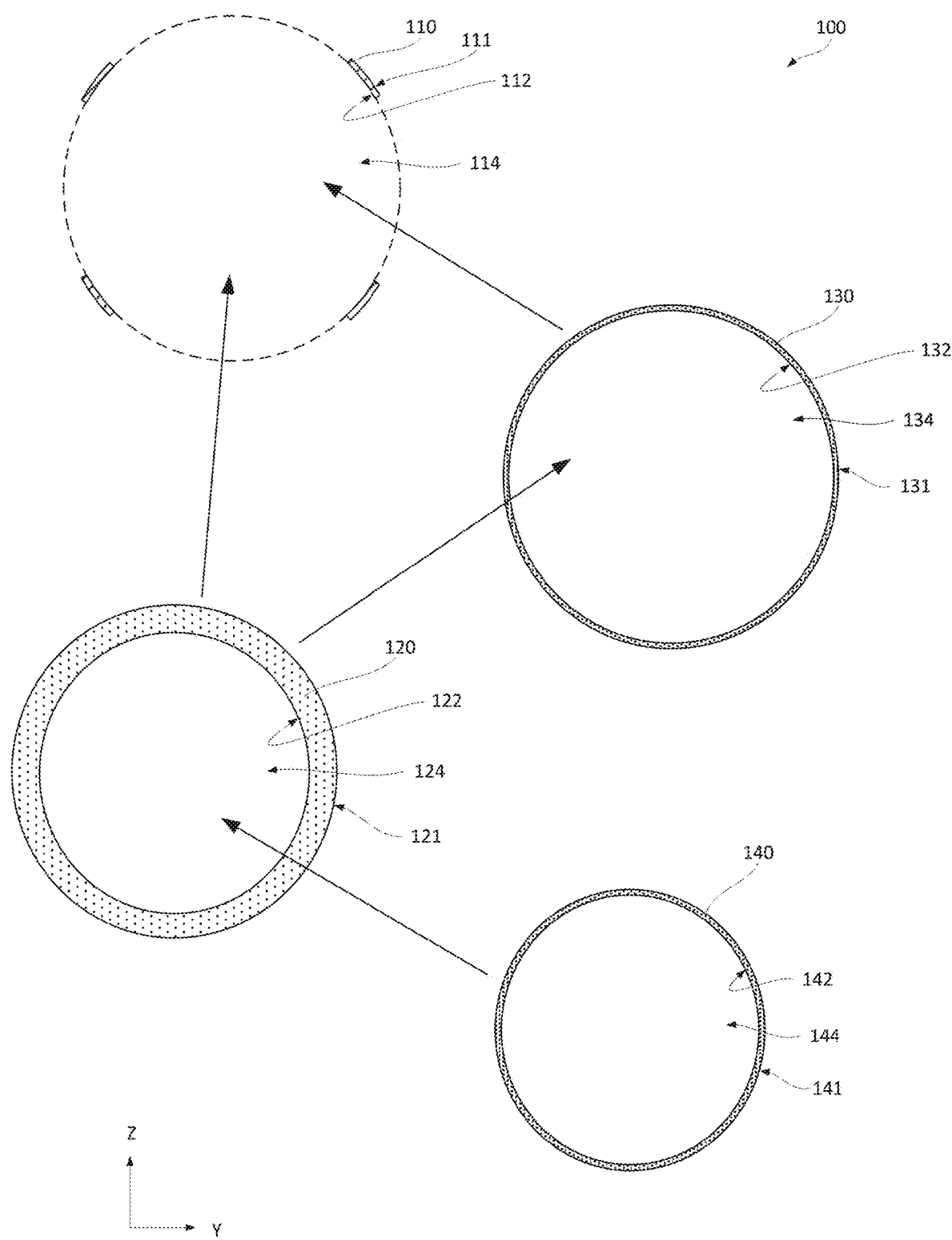
FIG. 2C is an exploded cross-sectional view of a duct, individually illustrating each component of the duct, in accordance with some examples.

Referring to FIGS. 2A, 2B, and 2C, duct 100 comprises exoskeleton structure 110 and sound-absorbing structure 120. Exoskeleton structure 110 is formed using additive manufacturing, which allows incorporating various features (described below) while maintaining a monolithic structure. Exoskeleton structure 110 comprises exoskeleton inner surface 112, having a tubular shape and defining exoskeleton interior 114. Exoskeleton structure 110 also comprises exoskeleton outer surface 111, opposite to exoskeleton inner surface 112.

Sound-absorbing structure 120 is disposed within exoskeleton interior 114 and conforms to exoskeleton inner surface 112. Sound-absorbing structure 120 comprises sound-absorbing inner surface 122, which also has a tubular shape. Sound-absorbing inner surface 122 defines sound-absorbing interior 124. Sound-absorbing structure 120 also comprises sound-absorbing outer surface 121, opposite of sound-absorbing inner surface 122.

Exoskeleton structure 110 defines and supports the cross-sectional shape of sound-absorbing structure 120. Some cross-sectional shape examples include, but are not limited to, a circular cross-section, an elliptical cross-section, a rectangular cross-section, a square cross-section, a triangular cross-section, or a hexagonal cross-section. As such, sound-absorbing structure 120 does not need to be self-supporting, which allows using various new materials for sound-absorbing structure 120 and improving sound-absorbing characteristics of duct 100. For example, sound-absorbing structure 120 may be formed from foams with higher porosity than conventional ducts.

In some examples, duct 100 also comprises external membrane 130 and/or internal membrane 140. For example, FIG. 2A illustrates duct 100 with both external membrane 130 and internal membrane 140. In this example, sound-absorbing structure 120 can be fully enclosed by external membrane 130 and internal membrane 140 (e.g., sealed from all environments by external membrane 130 and internal membrane 140). Referring to FIGS. 2B and 2C, external membrane 130 comprises external-membrane inner surface 132, also having a tubular shape and defining external-membrane interior 134. External membrane 130 also comprises external-membrane outer surface 131, opposite of external-membrane inner surface 132. When external membrane 130 is present, external-membrane inner surface 132 is in contact with the air flowing through duct 100. In other words, external-membrane inner surface 132 defines the interior of duct 100. External-membrane outer surface 131 contacts, at least in part, sound-absorbing structure 120. Internal membrane 140 comprises internal-membrane inner surface 142, also having a tubular shape and defining internal-membrane interior 144. Internal membrane 140 also comprises internal-membrane outer surface 141, opposite of internal-membrane inner surface 142. When internal membrane 140 is present, at least a portion of internal-membrane inner surface 142 contacts sound-absorbing structure 120. In some examples (further described below with reference to FIGS. 5A and 5B), an additional portion of internal-membrane inner surface 142 contacts or, more specifically, is sealed against external-membrane outer surface 131, e.g., to seal sound-absorbing structure 120 between external membrane 130 and internal membrane 140. Internal-membrane outer surface 141 contacts, at least in part, exoskeleton structure 110. In some examples, a portion of internal-membrane outer surface 141 is exposed, e.g., through the openings in exoskeleton structure 110.

Figure 2D:
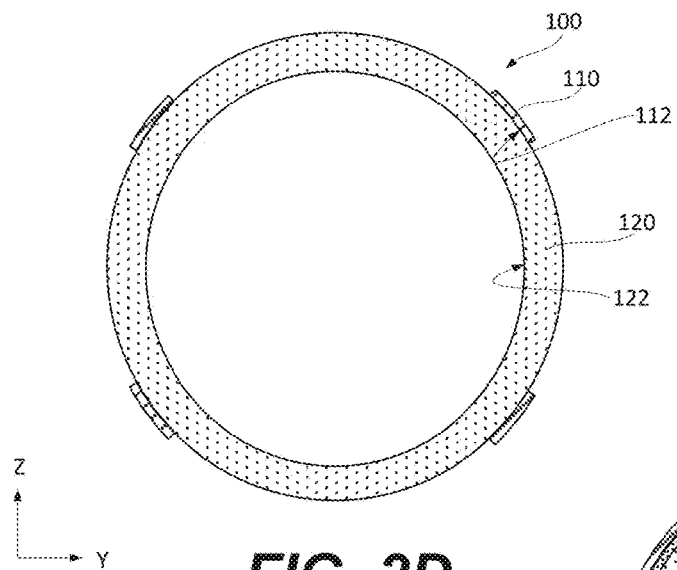
FIGS. 2D, 2E, and 2F are schematic cross-sectional views of a duct, showing various options for external and internal membranes, in accordance with some examples.

FIG. 2D illustrates another example, in which duct 100 does not have either external membrane 130 or internal membrane 140. In this example, sound-absorbing structure 120 directly interfaces exoskeleton structure 110. Furthermore, sound-absorbing inner surface 122 of sound-absorbing structure 120 is exposed to the air flowing within duct 100. In other words, sound-absorbing inner surface 122 forms the duct's interior. This example may be used to reduce the overall weight of duct 100, e.g., when additional insulation (e.g., from moisture) of sound-absorbing structure 120 is not needed.

Figure 2E:
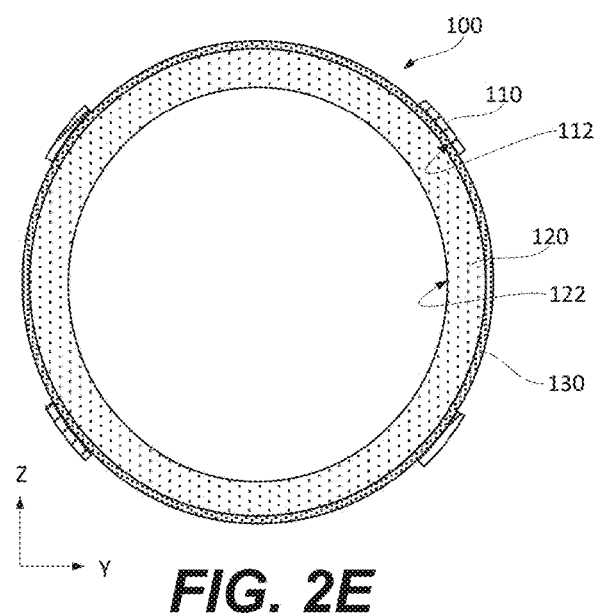
Figure 2F:
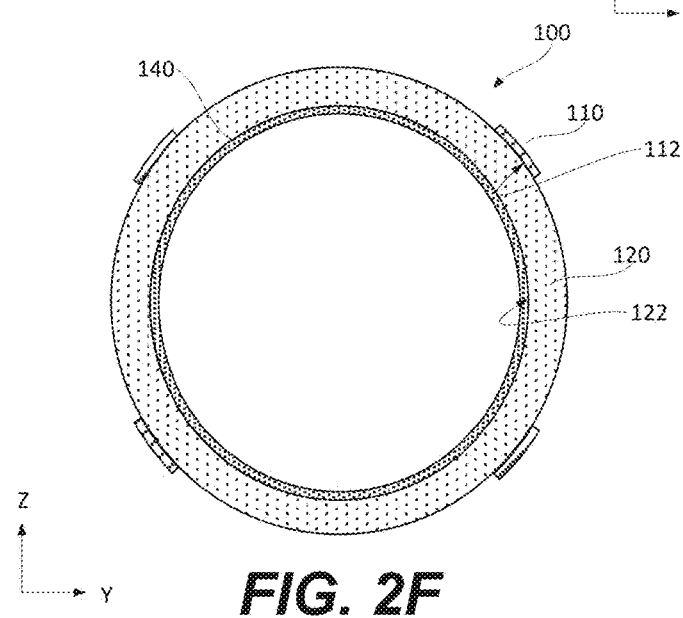

FIG. 2E illustrates yet another example in which duct 100 comprises external membrane 130 but not internal membrane 140. In this example, external membrane 130 is disposed between sound-absorbing structure 120 and exoskeleton structure 110. Sound-absorbing inner surface 122 remains exposed to the air flowing within duct 100 and forms the duct's interior.

Finally, FIG. 2E illustrates another example, in which duct 100 comprises internal membrane 140 but not external membrane 130. In this example, sound-absorbing structure 120 directly interfaces exoskeleton structure 110. However, sound-absorbing inner surface 122 is protected from air flowing within duct 100. This example may help to reduce the friction to the air flowing within duct 100.

Overall, in some examples, sound-absorbing structure 120 directly interfaces exoskeleton inner surface 112 as, e.g., is shown in FIGS. 2D and 2E. Alternatively, one or more other components (e.g., external membrane 130) are disposed between exoskeleton structure 110 and sound-absorbing structure 120 as, e.g., is shown in FIGS. 2A and 2E. In either case, exoskeleton structure 110 provides mechanical support to sound-absorbing structure 120 and other components of duct 100 (e.g., external membrane 130 and/or internal membrane 140) when these components are present.

In some examples, exoskeleton structure 110 comprises a thermoplastic polymer, such as polyetherimide (PEI) and polyetherketoneketone (PEKK). Thermoplastic polymers can be used in additive manufacturing, which allows forming exoskeleton structure 110 having various shapes and features, which are described below in more detail. Furthermore, thermoplastic polymers can be welded together and formed into complex shapes using, e.g., injection molding.

Figure 2G:
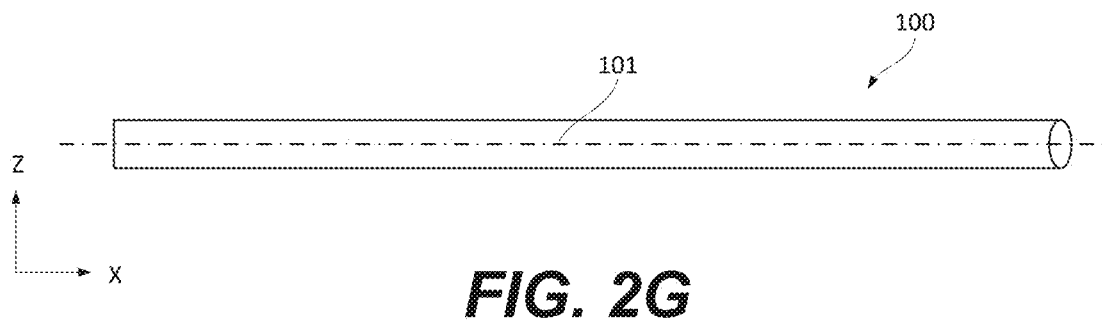
FIGS. 2G and 2H are schematic top views of a duct before and after bending of the duct, in accordance with some examples.
Figure 2H:
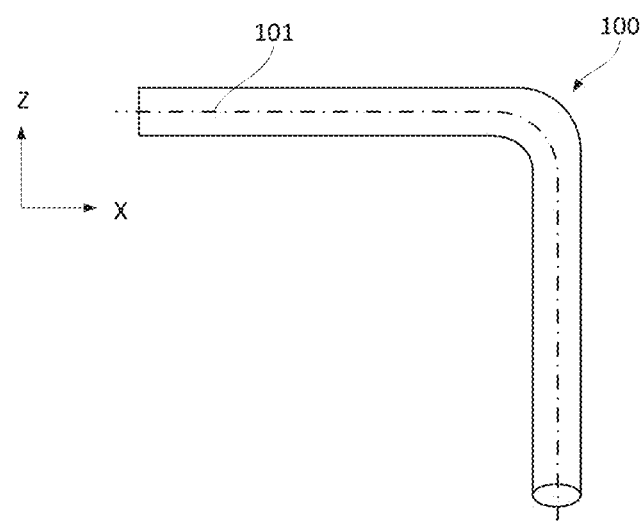

Referring to FIGS. 2A and 2B, in some examples, exoskeleton structure 110 comprises enclosed openings 116. Enclosed openings 116 are used to reduce the overall weight of exoskeleton structure 110 while providing sufficient support to sound-absorbing structure 120. Furthermore, enclosed openings 116 can be used to increase the flexibility (e.g., bendability) of exoskeleton structure 110 (and of the entire duct 100) as, e.g., is schematically shown in FIGS. 2G and 2H. For example, exoskeleton structure 110 is configured to allow bending of duct 100 about any axes perpendicular to center axis 101.

In some examples, the area of enclosed openings 116 is greater than the area of exoskeleton inner surface 112. In more specific examples, the ratio of the area of enclosed openings 116 to the area of inner exoskeleton surface 112 is at least about 2, at least about 4, or even at least about 10. As noted above, this level of enclosed openings 116 ensures weight savings and bendability.

In some examples, enclosed openings 116 are evenly distributed throughout exoskeleton inner surface 112. The even distribution of enclosed openings 116 ensures the even mechanical support and other characteristics of exoskeleton structure 110. Enclosed openings 116 are separated by exoskeleton structure portions that form these enclosed openings 116. These exoskeleton structure portions provide the support to sound-absorbing structure 120.

In some examples, at least some of enclosed openings 116 have a rhombus shape. This shape allows minimizing the size of the exoskeleton structure portions, surrounding these enclosed openings 116 while providing uniform support to sound-absorbing structure 120. Other shapes of enclosed openings 116 (e.g., round, square, hexagonal, and/or a combination thereof) are also within the scope. In some examples, the principal (largest) dimension of enclosed openings 116 is from 5 millimeters to 100 millimeters or, more specifically, from 10 millimeters to 50 millimeters such as between 20 millimeters to 40 millimeters.

In the same or other examples, the diameter or, more generally, the principal cross-sectional dimension of sound-absorbing structure 120 is from 20 millimeters to 40 millimeters to 400 millimeters or, more specifically, from 50 millimeters to 300 millimeters such as from 100 millimeters to 200 millimeters. In the same or other examples, the length of sound-absorbing structure 120 is from 0.5 meters to 3 meters or, more specifically, from 0.75 meters to 2 meters such as from 1 meter to 1.5 meters.

In some examples, sound-absorbing structure 120 comprises an open-cell foam, such as melamine foam, polyimide foam, kevlar, and other like foams. The uncompressed thickness of sound-absorbing structure 120 can be from 5 millimeters to 30 millimeters or, more specifically, from 8 millimeters to 20 millimeters.

As noted above, in some examples, duct 100 further comprises external membrane 130, disposed between exoskeleton structure 110 and sound-absorbing structure 120. For example, external membrane 130 is in direct contact with exoskeleton inner surface 112 and/or sound-absorbing structure 120. External membrane 130 is used, e.g., to protect sound-absorbing structure 120 from the ambient environment. As a result of this protection, a larger variety of sound-absorbing materials can be used for sound-absorbing structure 120 as described above.

In some examples, external membrane 130 is formed from polyether ketone-ketone (PEKK) film, a polyether ether-ketone (PEEK) film, a metalized polyether ether-ketone (MPEEK) film, a polyvinyl fluoride (PVF), a non-flammable material pressure-sensitive tape, or a combination thereof (e.g., a first layer of PEKK film and a second layer of PEEK film). In some examples, external membrane 130 comprises an adhesive (e.g., a heat-activated adhesive) on a non-metalized inner surface, which faces sound-absorbing structure 120. In some examples, external membrane 130 is formed from a high-mass fabric, such as a woven material with high-mass resin. In the same or other examples, the thickness of external membrane 130 is from 0.005 millimeters to 1 millimeter or, more specifically, from 0.050 millimeters to 0.5 millimeters.

In some examples, duct 100 further comprises internal membrane 140, disposed within sound-absorbing interior 124. For example, internal membrane 140 conforms to sound-absorbing inner surface 122 or, in more specific examples, directly contacts sound-absorbing inner surface 122 of sound-absorbing structure 120. Internal membrane 140 is used, e.g., to protect sound-absorbing structure 120 from the air flowing within through duct 100. For example, the air may contain some moisture. Furthermore, internal membrane 140 provides a smooth interior surface, interfacing the air.

In some examples, internal membrane 140 is formed from polyether ketone-ketone (PEKK) film, a polyether ether ketone (PEEK) film, a metalized polyether ether-ketone (MPEEK) film, a polyvinyl fluoride (PVF), a non-flammable material pressure-sensitive tape, or a combination thereof (e.g., a first layer of PEKK film and a second layer of PEEK film). In some examples, internal membrane 140 comprises an adhesive (e.g., a heat-activated adhesive) on a non-metalized inner surface, which faces sound-absorbing structure 120 or on a non-metalized outer surface facing exoskeleton structure 110. In some examples, internal membrane 140 is formed from a high-mass fabric, such as a woven material with high-mass resin. In the same or other examples, the thickness of internal membrane 140 is from 0.005 millimeters to 1 millimeter or, more specifically, from 0.050 millimeters to 0.5 millimeters.

In some examples, external membrane 130 is sealed relative to internal membrane 140 thereby isolating sound-absorbing structure 120 from any environment. For example, external membrane 130 and internal membrane 140 may be heat sealed (e.g., thermally welded), adhered, or otherwise sealed. In more specific examples, the seal extends over the entire perimeter of sound-absorbing structure 120.

Figure 3A:
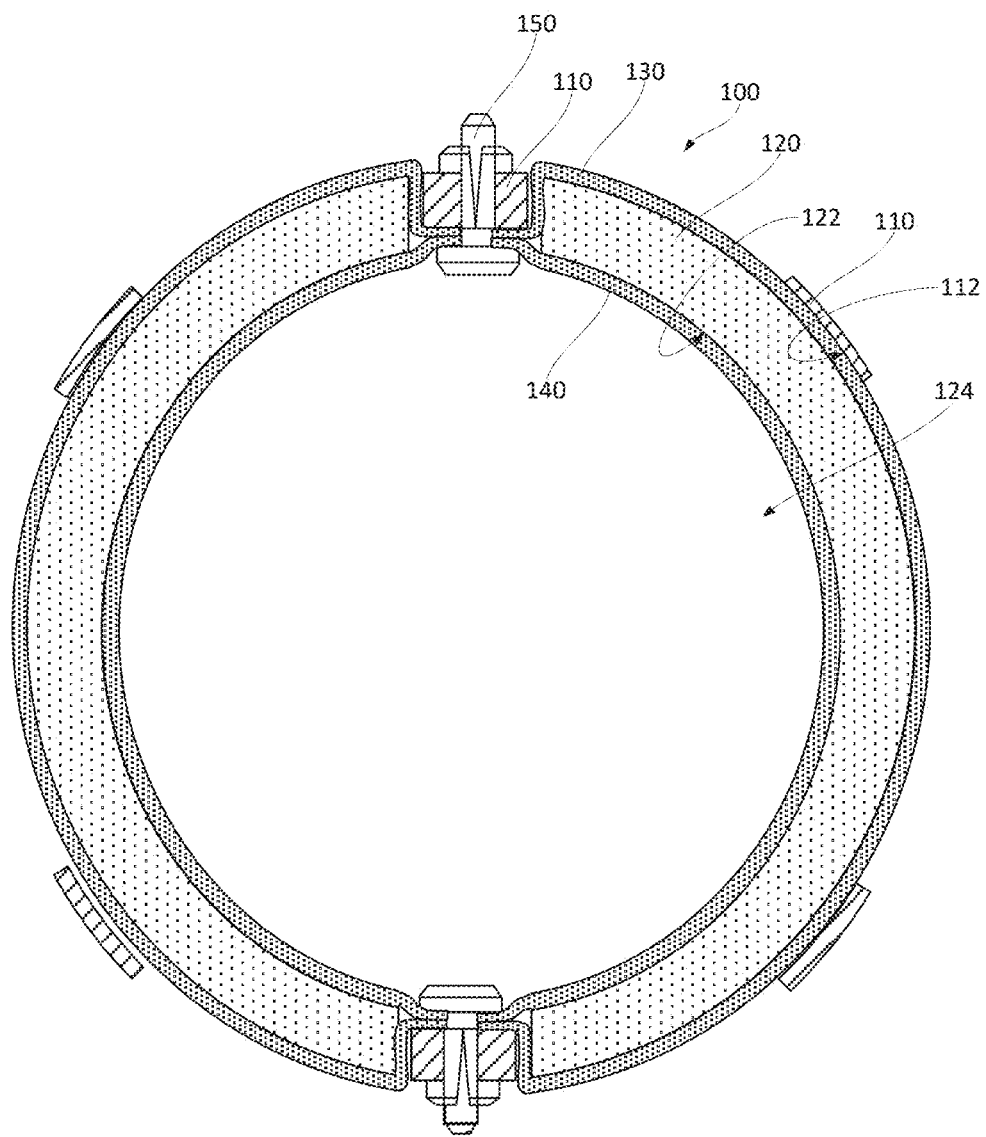
FIG. 3A is a schematic cross-sectional view of a duct illustrating inner-membrane fasteners, in accordance with some examples.

Referring to FIG. 3A, in some examples, duct 100 further comprises inner-membrane fastener 150. Inner-membrane fastener 150 protrudes through at least internal membrane 140 and supports internal membrane 140 relative to exoskeleton structure 110. This support of internal membrane 140 also supports sound-absorbing structure 120 relative to exoskeleton structure 110. As noted above, sound-absorbing structure 120 is disposed between internal membrane 140 and exoskeleton structure 110. In some examples, inner-membrane fastener 150 protrudes through sound-absorbing structure 120 and/or external membrane 130.

Referring to FIG. 3A, in some examples, at least a portion of inner-membrane fastener 150 is monolithic with exoskeleton structure 110. This fastener integration allows minimizing the number of parts needed for assembling duct 100. For example, inner-membrane fastener 150 can be a push-pin inserted through exoskeleton structure 110. In these examples, exoskeleton structure 110 is equipped with a locking mechanism for receiving and retaining a portion of the push-pin.

Figure 3B:
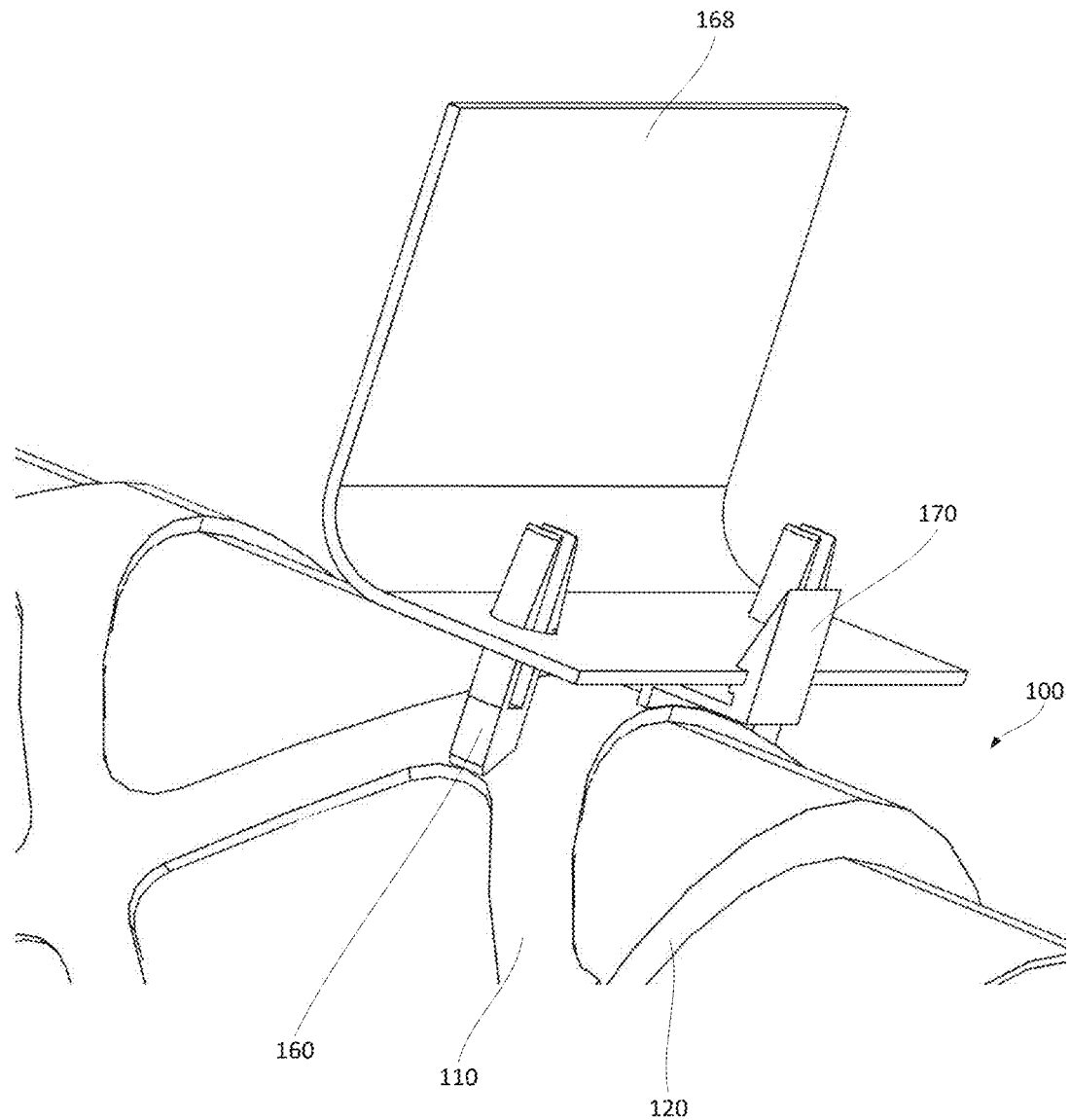
FIG. 3B is a schematic perspective view of a duct portion showing snap fasteners and an axial limiter, in accordance with some examples.

Referring to FIG. 3B, in some examples, exoskeleton structure 110 comprises snap fastener 160, monolithic with remaining parts of exoskeleton structure 110. Snap fastener 160 extends away from sound-absorbing structure 120 or, more specifically, from center axis 101 of duct 100. Snap fastener 160 is used for attaching and supporting duct 100 on an external structure, such as bracket 168 shown in FIG. 3B. For example, snap fastener 160 at least partially protrudes through an opening in bracket 168 and locks within this opening (e.g., using an interlocking feature). The integration of snap fastener 160 into exoskeleton structure 110 allows minimizing the number of parts needed for the overall duct assembly.

Referring to FIG. 3B, in some examples, exoskeleton structure 110 comprises axial limiter 170, monolithic with remaining parts of exoskeleton structure 110. Axial limiter 170 is used for limiting at least the axial movement of duct 100 (e.g., along center axis 101 of duct 100) relative to the external structure, such as bracket 168 shown in FIG. 3B. The integration of axial limiter 170 into exoskeleton structure 110 allows minimizing the number of parts needed for the overall duct assembly.

Figure 4A:
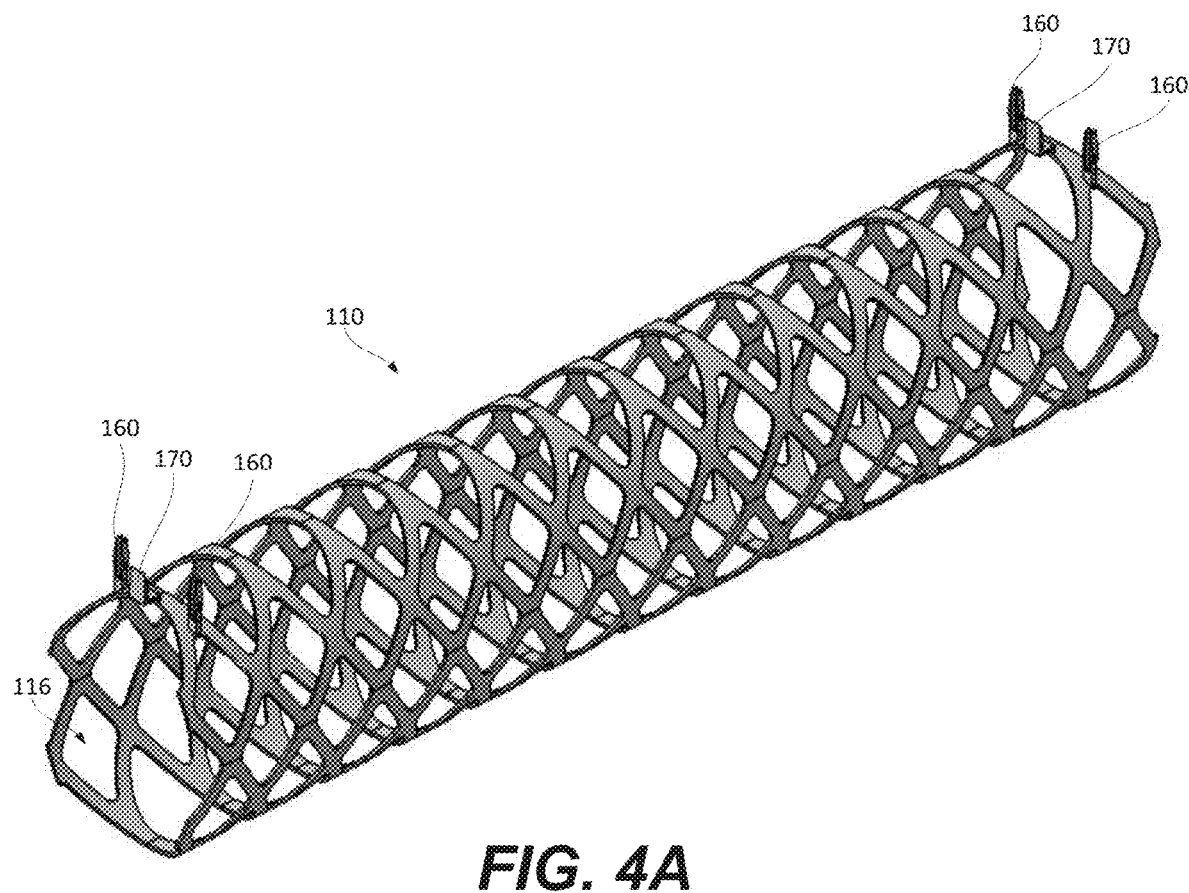
FIG. 4A is a schematic perspective view of an exoskeleton structure illustrating enclosed openings of the exoskeleton structure as well as snap fasteners and an axial limiter of the exoskeleton structure, in accordance with some examples.
Figure 4B:
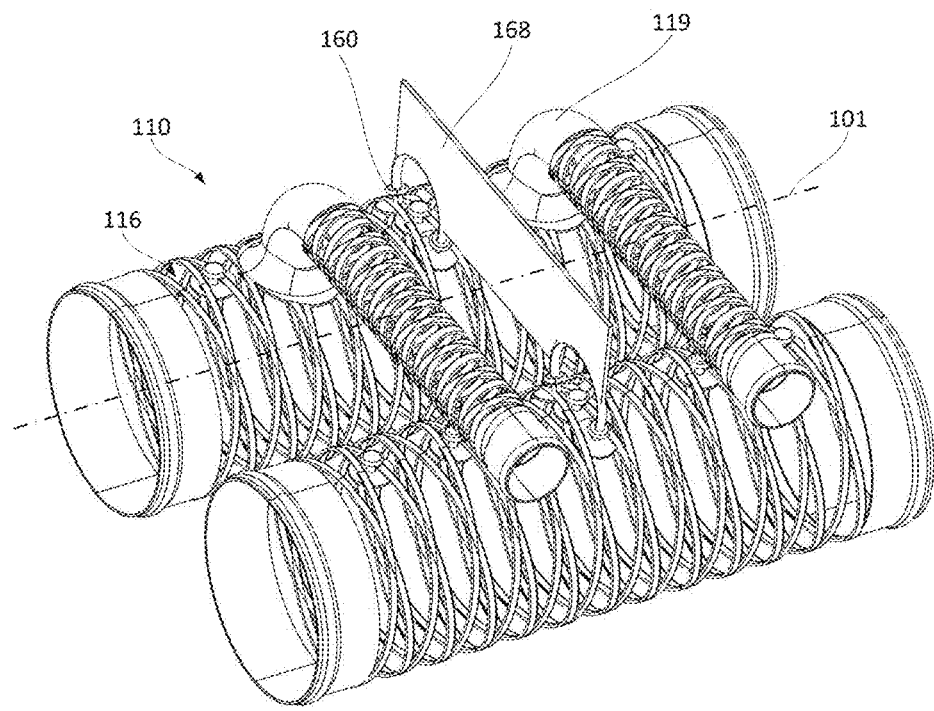
FIG. 4B is a schematic perspective view of another example of the exoskeleton structure, configured to provide support to two separate parallel sound-absorbing structures and forming a fluidic connection to one of these sound-absorbing structures through duct split portions.

These and other aspects of exoskeleton structure 110 are enabled by additive manufacturing of exoskeleton structure 110. FIGS. 4A and 4B illustrate two examples of exoskeleton structure 110 formed by additive manufacturing. Specifically, the example in FIG. 4A is similar to the one shown and described above with reference to FIGS. 2B and 3B. In this example, exoskeleton structure 110 comprises snap fasteners 160 and axial limiters 170 (monolithic with the rest of exoskeleton structure 110). Exoskeleton structure 110 also comprises enclosed openings 116 having a rhombus shape.

FIG. 4B illustrates another example of exoskeleton structure 110 with a different type of snap fasteners 160 and a different type of enclosed openings 116. Specifically, exoskeleton structure 110 in FIG. 4B is configured to support two sound-absorbing structures, extending parallel to each other. This exoskeleton structure 110 comprises two portions, which can be integrated together or be separated from each other. FIG. 4B also illustrates that one portion of exoskeleton structure 110 comprises duct split portions 119, extending away from center axis 101 of this portion. Duct split portions 119 allow diverting a portion of the airflow to various components, e.g., air vents, positioned along the length of duct 100.

Figure 5A:
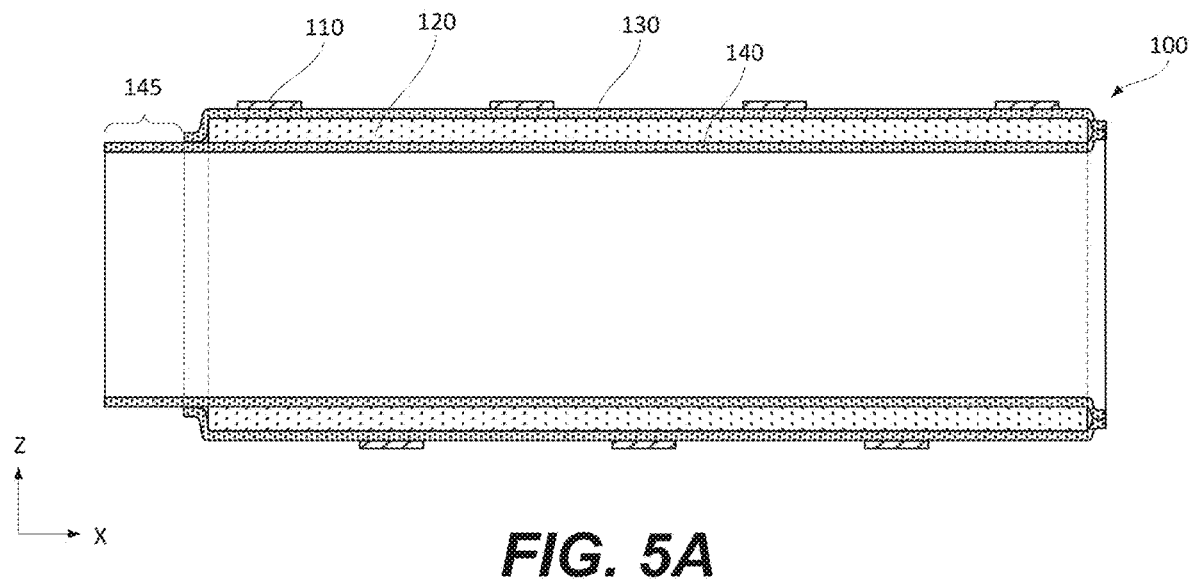
FIG. 5A is a schematic cross-sectional view of a duct illustrating a connecting sleeve formed by an internal membrane and extending past an exoskeleton structure, in accordance with some examples.
Figure 5B:
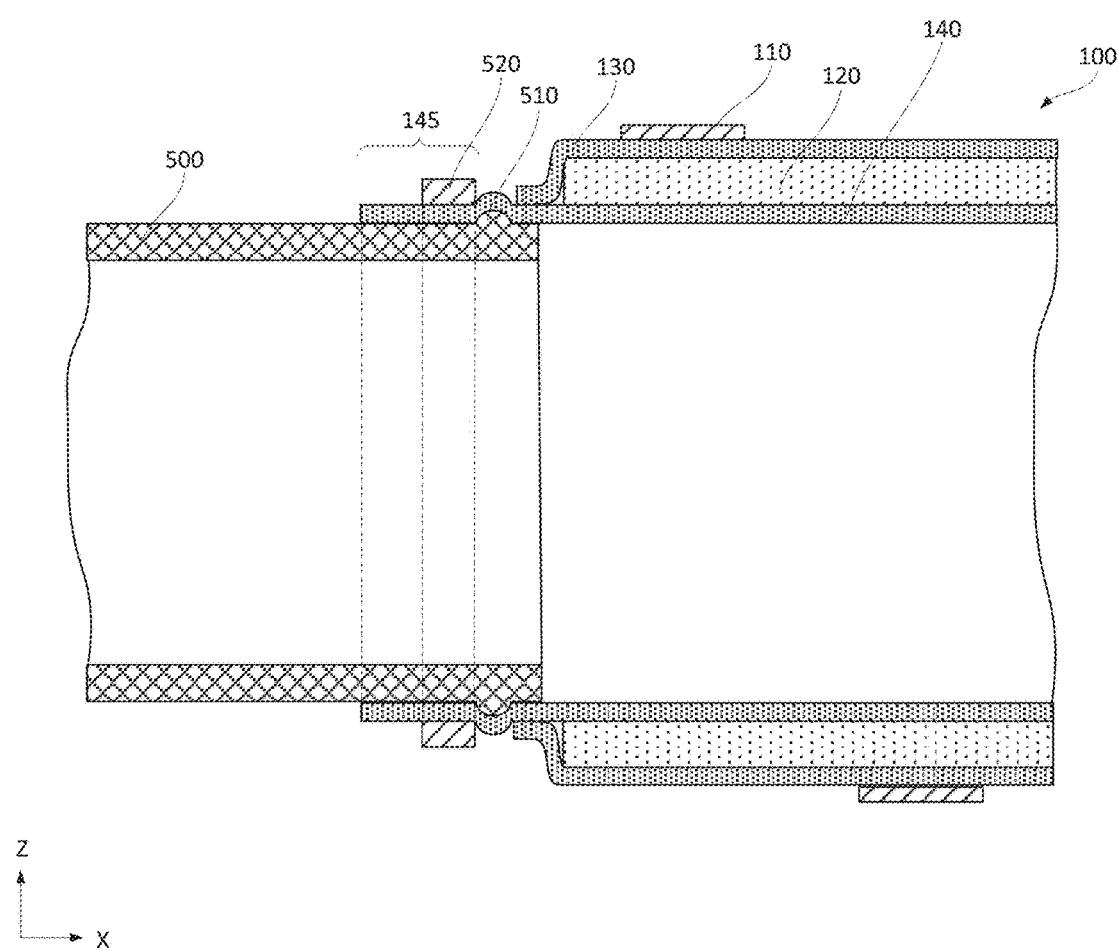
FIG. 5B is a schematic cross-sectional view of a duct connected to another structure using a connecting sleeve, in accordance with some examples.

Referring to FIG. 5A, in some examples, a portion of internal membrane 140 extends past sound-absorbing structure 120 forming connecting sleeve 145. Connecting sleeve 145 can be used for connecting to other components of the same ECS system, e.g., other ducts, air vents, and the like. This connection to component 500 is schematically shown in FIG. 5B. For example, component 500 comprises annular protrusion 510 such that connecting sleeve 145 extends over and past this annular protrusion 510. The overall assembly also comprises annular clamp 520, which forces a portion of connecting sleeve 145 against component 500. As shown in FIG. 5B, this portion of connecting sleeve 145 extends past annular protrusion 510.

In some examples, a portion of external membrane 130 extending past sound-absorbing structure 120. This portion can also form a connecting sleeve, similar to connecting sleeve 145 of internal membrane 140 described above. Furthermore, in some examples, this portion of external membrane 130 is sealed against a similar extending portion of internal membrane 140 as, e.g., is shown in FIG. 5A.

Duct Manufacturing Examples

Figure 6:
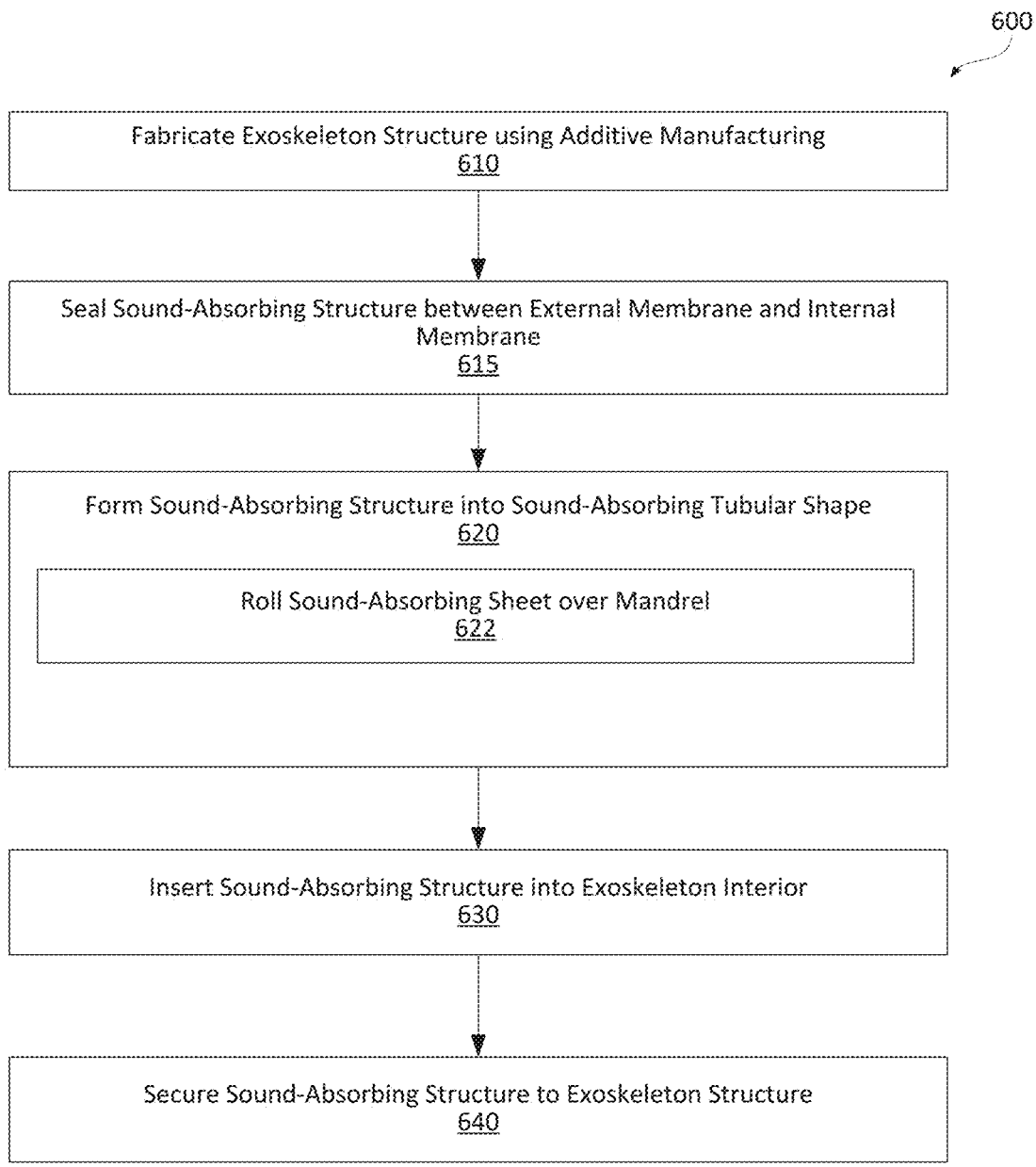
FIG. 6 is a process flowchart corresponding to a method for fabricating a duct, in accordance with some examples.

FIG. 6 illustrates a process flowchart corresponding to method 600 of manufacturing duct 100. Various examples of duct 100 are described above. In some examples, method 600 comprises (block 610) fabricating exoskeleton structure 110 using additive manufacturing. Exoskeleton structure 110 comprises exoskeleton inner surface 112 having a tubular shape and defining an exoskeleton interior 114. Additive manufacturing allows integrating various features into exoskeleton structure 110. For example, these features and other parts of exoskeleton structure 110 can be monolithic (e.g., a single continuous piece without any joint interfaces). Alternately, exoskeleton structure 110 comprises multiple pieces joined together with hinges and/or snaps to facilitate additive manufacturing and allow forming exoskeleton structure 110 that is particularly long.

Alternatively, exoskeleton structure 110 is injection molded. For example, exoskeleton structure 110 comprises two mating halves, e.g., separated along the plane containing the center axis of exoskeleton structure 110. These two halves are snapped together around sound-absorbing structure 120, which is formed in a sound-absorbing tubular shape before this snapping operation.

Figure 7A:
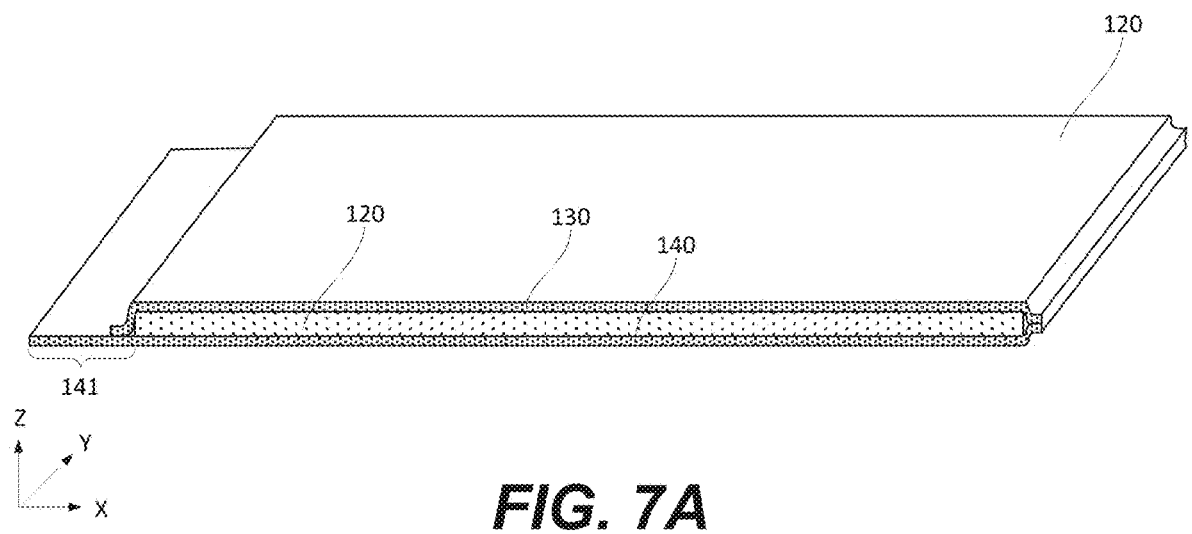
FIGS. 7A-7D are various stages during the fabrication of a duct, in accordance with some examples.

In some examples, method 600 comprises (block 615) sealing sound-absorbing structure 120 between external membrane 130 and internal membrane 140. This operation is performed, e.g., before forming sound-absorbing structure 120 into a sound-absorbing tubular shape as further described below. A sub-assembly formed during this operation and comprising sound-absorbing structure 120, sealed between external membrane 130 and internal membrane 140, is shown in FIG. 7A. In some examples, the subassembly is substantially planar upon completing this operation.

Figure 7B:
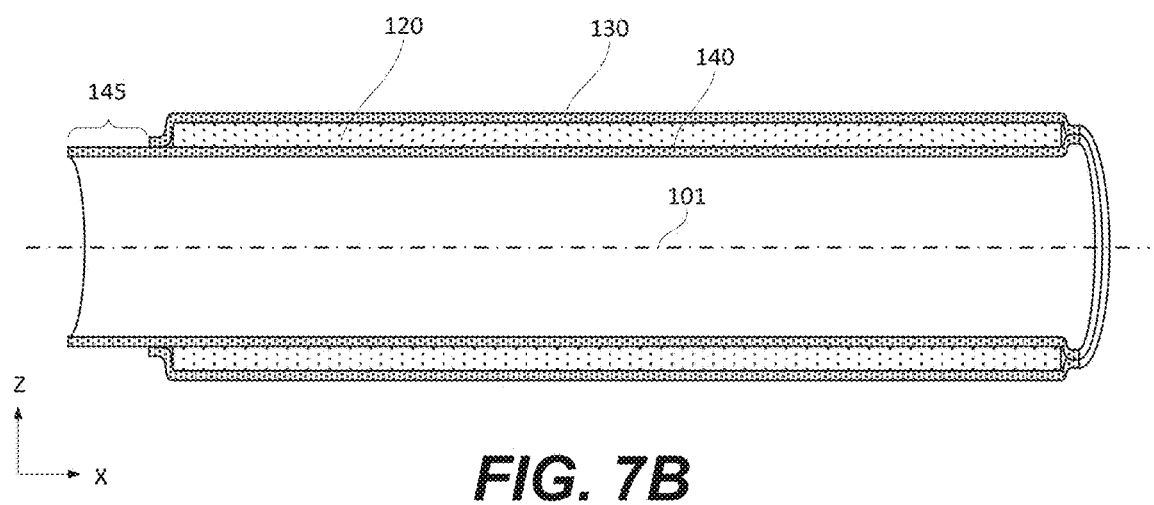

In some examples, method 600 comprises (block 620) forming sound-absorbing structure 120 into a sound-absorbing tubular shape as, for example, is schematically shown in FIG. 7B. In more specific examples, (block 620) forming sound-absorbing structure 120 into sound-absorbing tubular shape comprises (block 622) rolling a sound-absorbing sheet over a mandrel, having the sound-absorbing tubular shape.

Figure 7C:
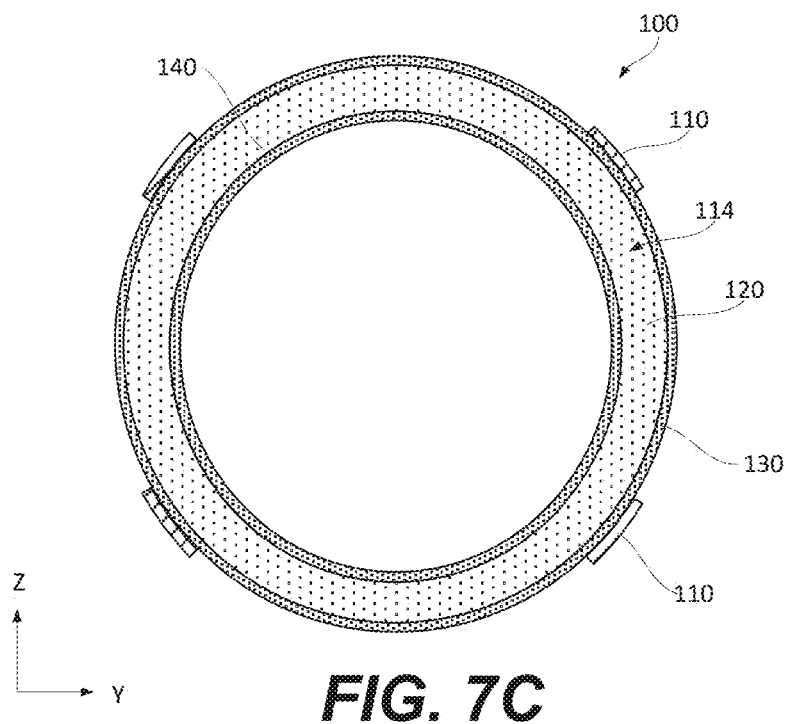

In some examples, method 600 comprises (block 630) inserting sound-absorbing structure 120 into exoskeleton interior 114 such that sound-absorbing structure 120 conforms to exoskeleton inner surface 112 as, e.g., is schematically shown in FIG. 7C. In more specific examples, a mandrel used to form the sound-absorbing tubular shape may remain inside sound-absorbing structure 120 during this operation.

Figure 7D:
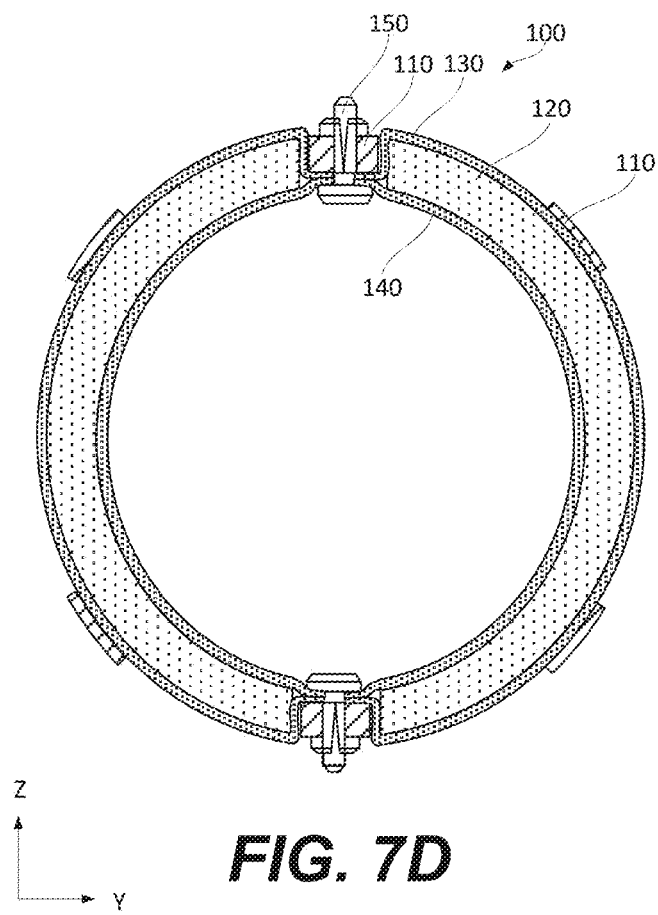

In some examples, method 600 comprises (block 640) securing sound-absorbing structure 120 to exoskeleton structure 110 such that sound-absorbing structure 120 retains sound-absorbing tubular shape. For example, inner-membrane fasteners 150 are used for this operation as, e.g., is schematically shown in FIG. 7D.

Aircraft Examples

In some examples, methods, and systems described above are used on aircraft and, more generally, by the aerospace industry. Specifically, these methods and systems can be used during the fabrication of aircraft as well as during aircraft service and maintenance.

Figure 8:
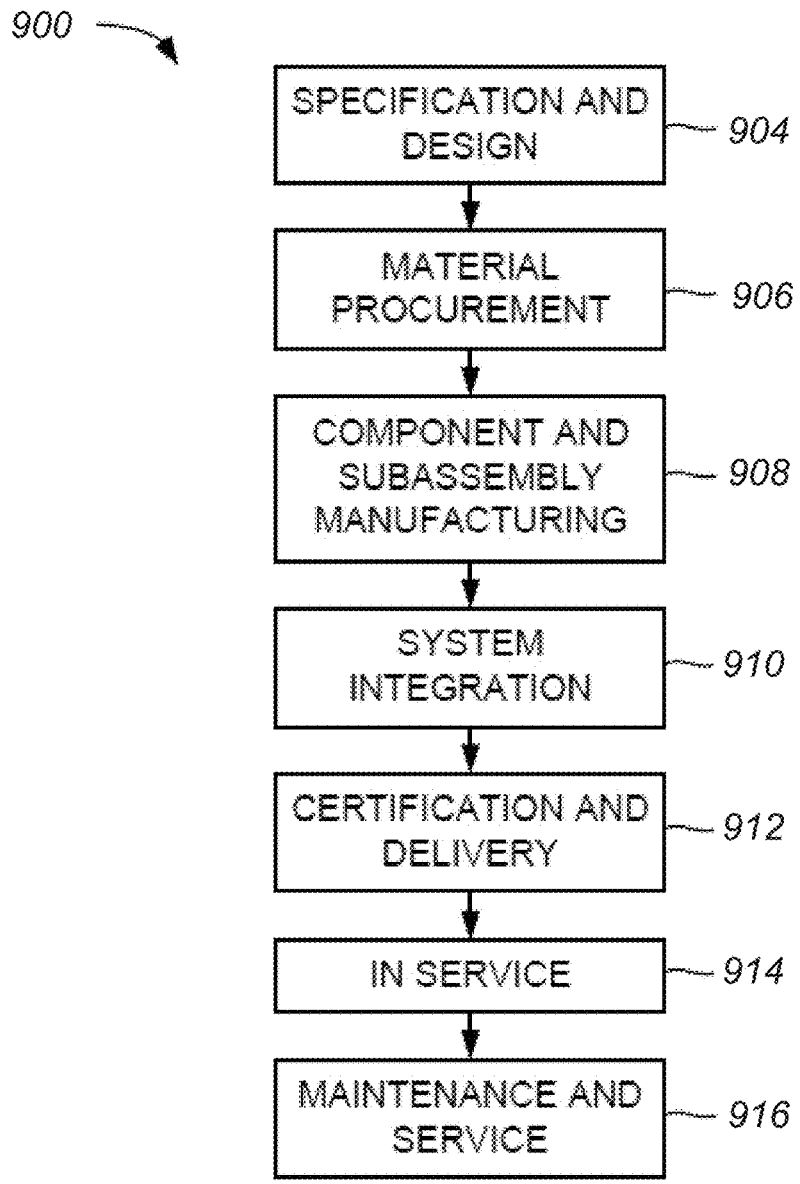
FIG. 8 is a process flowchart corresponding to a method for manufacturing and servicing the aircraft.
Figure 9:
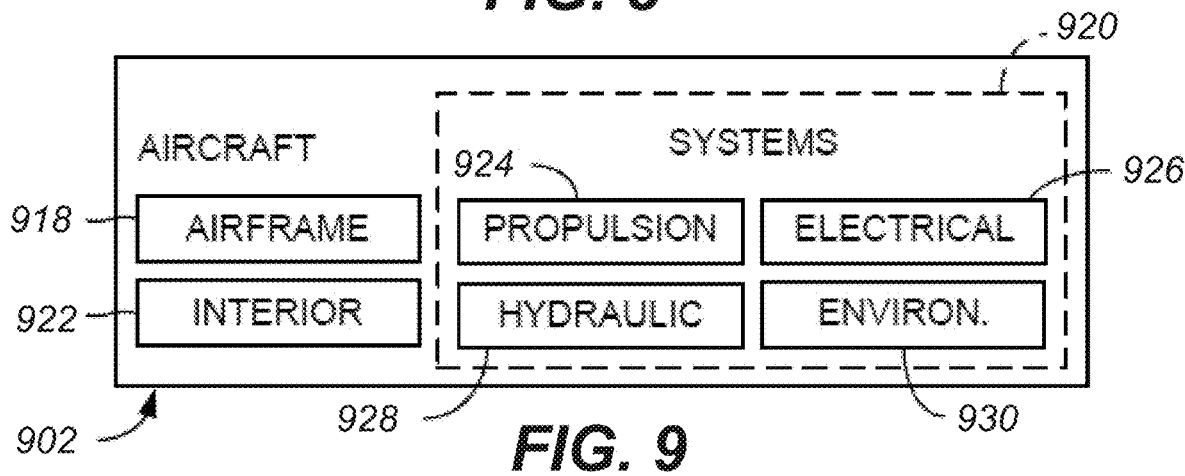
FIG. 9 illustrates a block diagram of an example aircraft, in accordance with some examples.

Accordingly, the apparatus and methods described above are applicable for aircraft manufacturing and service method 900 as shown in FIG. 8 and for aircraft 902 as shown in FIG. 9. During pre-production, method 900 includes specification and design 904 of aircraft 902 and material procurement 906. During production, component, and subassembly manufacturing 908 and system integration 910 of aircraft 902 takes place. Thereafter, aircraft 902 goes through certification and delivery 912 to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For this description, a system integrator includes without limitation any number of aircraft manufacturers and major-system subcontractors; a third party includes without limitation any number of vendors, subcontractors, and suppliers; and an operator can be an airline, leasing company, military entity, service organization, and so on.

As shown in FIG. 9, aircraft 902 produced by method 900 includes airframe 918 with plurality of systems 920 and interior 922. The airframe 918 includes the wings of aircraft 902. Examples of systems 920 include one or more of propulsion system 924, electrical system 926, hydraulic system 928, and environmental system 930 or, more specifically, an ECS system comprising one or more sound-attenuating ducts described above. Any number of other systems can be included.

Apparatus and methods presented herein can be employed during any one or more of the stages of method 900. For example, components or subassemblies corresponding to manufacturing 908 are fabricated or manufactured like components or subassemblies produced while aircraft 902 is in service. Also, one or more apparatus examples, method examples, or a combination thereof are utilized during manufacturing 908 and system integration 910, for example, by substantially expediting assembly of or reducing the cost of an aircraft 902. Similarly, one or more apparatus examples, method examples, or a combination thereof are utilized while aircraft 902 is in service, for example, and without limitation, to maintenance and service 916.

FURTHER EXAMPLES

Further, the description includes examples according to the following clauses:

Clause 1. A duct comprising:
an exoskeleton structure, formed using additive manufacturing and comprising an exoskeleton inner surface, the exoskeleton inner surface having a tubular shape and defining an exoskeleton interior; and
a sound-absorbing structure, disposed within the exoskeleton interior and conforming to the exoskeleton inner surface, the sound-absorbing structure comprising a sound-absorbing inner surface defining a sound-absorbing interior.

Clause 2. The duct of clause 1, further comprising an external membrane, disposed between the exoskeleton structure and the sound-absorbing structure such that the external membrane is in direct contact with the exoskeleton inner surface.

Clause 3. The duct of clause 2, wherein the external membrane is in direct contact with the exoskeleton structure.

Clause 4. The duct of clause 1, further comprising an internal membrane, disposed within the sound-absorbing interior and conforming to the sound-absorbing inner surface.

Clause 5. The duct of clause 4, further comprising an external membrane, disposed between the exoskeleton structure and the sound-absorbing structure such that the external membrane is in direct contact with the exoskeleton inner surface.

Clause 6. The duct of clause 5, wherein the external membrane is sealed relative to the internal membrane thereby isolating the sound-absorbing structure from environment.

Clause 7. The duct of clause 6, wherein a portion of the internal membrane extends past the sound-absorbing structure forming a connecting sleeve.

Clause 8. The duct of clause 5, wherein at least one of the internal membrane or the external membrane comprises a polyether ketone-ketone (PEKK) film, a polyether etherketone (PEEK) film, a polyvinyl fluoride (PVF), a non-flammable material pressure-sensitive tape, or a combination thereof.

Clause 9. The duct of clause 5, further comprising an inner-membrane fastener, wherein:
the inner-membrane fastener protrudes through the internal membrane and the sound-absorbing structure; and
the inner-membrane fastener supports the internal membrane and the sound-absorbing structure relative to the exoskeleton structure.

Clause 10. The duct of clause 9, wherein at least a portion of the inner-membrane fastener is monolithic with the exoskeleton structure.

Clause 11. The duct of clause 9, further comprising an external membrane, wherein:

the inner-membrane fastener further protrudes through the external membrane; and the inner-membrane fastener supports the external membrane relative to the exoskeleton structure.

Clause 12. The duct of any one of clauses 1-11, wherein the exoskeleton structure comprises a thermoplastic polymer.

Clause 13. The duct of any one of clauses 1-12, wherein the exoskeleton structure comprises a plurality of enclosed openings, evenly distributed around the inner exoskeleton surface.

Clause 14. The duct of clause 13, wherein at least some openings of the plurality of enclosed openings have a rhombus shape.

Clause 15. The duct of clause 13, wherein an area of the plurality of enclosed openings is greater than an area of the inner exoskeleton surface.

Clause 16. The duct of clause 13, wherein an area of the plurality of enclosed openings is at least twice greater than an area of the inner exoskeleton surface.

Clause 17. The duct of any one of clauses 1-16, wherein the exoskeleton structure comprises a snap fastener, monolithic with remaining parts of the exoskeleton structure and extending away from the sound-absorbing structure, the snap fastener being used for attaching and supporting the duct on an external structure.

Clause 18. The duct of clause 17, wherein the exoskeleton structure comprises an axial limiter, monolithic with remaining parts of the exoskeleton structure and used for limiting at least an axial movement of the duct relative to the external structure.

Clause 19. The duct of any one of clauses 1-18, wherein:
the tubular shape is defined by a center axis of the duct;
the exoskeleton structure is configured to retain a cross-section of the tubular shape, perpendicular to the center axis; and
the exoskeleton structure is further configured to provide bending of the duct about any axes perpendicular to the center axis.

Clause 20. The duct of any one of clause 1-19, wherein the tubular shape has at least one of a circular cross-section, an elliptical cross-section, a rectangular cross-section, a square cross-section, a triangular cross-section, or a hexagonal cross-section.

Clause 21. The duct of any one of clauses 1-20, wherein:
the tubular shape is defined by a center axis of the duct; and
the exoskeleton structure comprises a duct split portion, extending away from the center axis.

Clause 22. The duct of any one of clauses 1-21, wherein the sound-absorbing structure comprises melamine foam.

Clause 23. A vehicle comprising:
an environmental control system comprising a duct, wherein the duct comprises:
an exoskeleton structure, formed using additive manufacturing and comprising an exoskeleton inner surface, the exoskeleton inner surface having a tubular shape and defining an exoskeleton interior; and
a sound-absorbing structure, disposed within the exoskeleton interior and conforming to the exoskeleton inner surface, the sound-absorbing structure comprising a sound-absorbing inner surface defining a sound-absorbing interior;

Clause 24. The vehicle of clause 23, wherein the vehicle is an aircraft.

Clause 25. A method of manufacturing a duct, the method comprising:

fabricating an exoskeleton structure using additive manufacturing, the exoskeleton structure comprising an exoskeleton inner surface having an exoskeleton tubular shape and defining an exoskeleton interior;

forming a sound-absorbing structure into a sound-absorbing tubular shape, complimentary to the exoskeleton tubular shape;

inserting the sound-absorbing structure into the exoskeleton interior such that sound-absorbing structure conforms to the exoskeleton inner surface; and securing the sound-absorbing structure to the exoskeleton structure such that the sound-absorbing structure retains the sound-absorbing tubular shape.

Clause 26. The method of clause 25, wherein forming the sound-absorbing structure into the sound-absorbing tubular shape comprising rolling a sound-absorbing sheet over a mandrel, having the sound-absorbing tubular shape.

Clause 27. The method of clause 25, further comprising, before forming the sound-absorbing structure into the sound-absorbing tubular shape, sealing the sound-absorbing structure between an external membrane and an internal membrane.

CONCLUSION

Although the foregoing concepts have been dECSribed in some detail for purposes of clarity of understanding, it will be apparent that certain changes and modifications may be practiced within the scope of the appended clauses. It should be noted that there are many alternative ways of implementing the processes, systems, and apparatus. Accordingly, the present examples are to be considered illustrative and not restrictive.

What is claimed is:

1. A duct comprising:
an exoskeleton structure, formed using additive manufacturing and comprising an exoskeleton inner surface, the exoskeleton inner surface having a tubular shape and defining an exoskeleton interior;
a sound-absorbing structure, disposed within the exoskeleton interior and conforming to the exoskeleton inner surface, the sound-absorbing structure comprising a sound-absorbing inner surface defining a sound-absorbing interior;
an internal membrane, disposed within the sound-absorbing interior and conforming to the sound-absorbing inner surface;
an external membrane, disposed between the exoskeleton structure and the sound-absorbing structure such that the external membrane is in direct contact with the exoskeleton inner surface;
an inner-membrane fastener, wherein:
the inner-membrane fastener protrudes through the internal membrane and the sound-absorbing structure; and
the inner-membrane fastener supports the internal membrane and the sound-absorbing structure relative to the exoskeleton structure.

2. The duct of claim 1, wherein the external membrane is sealed relative to the internal membrane thereby isolating the sound-absorbing structure from environment.

3. The duct of claim 1, wherein at least one of the internal membrane or the external membrane comprises a polyether ketone-ketone (PEKK) film, a polyether ether-ketone (PEEK) film, a polyvinyl fluoride (PVF), a non-flammable material pressure-sensitive tape, or a combination thereof.

4. The duct of claim 1, wherein at least a portion of the inner-membrane fastener is monolithic with the exoskeleton structure.

5. The duct of claim 1, wherein:
the inner-membrane fastener further protrudes through the external membrane; and
the inner-membrane fastener supports the external membrane relative to the exoskeleton structure.

6. The duct of claim 1, wherein the exoskeleton structure comprises a plurality of enclosed openings, evenly distributed around the inner exoskeleton surface.

7. The duct of claim 6, wherein at least some openings of the plurality of enclosed openings have a rhombus shape.

8. The duct of claim 6, wherein an area of the plurality of enclosed openings is greater than an area of the inner exoskeleton surface.

9. The duct of claim 6, wherein an area of the plurality of enclosed openings is at least twice greater than an area of the inner exoskeleton surface.

10. The duct of claim 1, wherein the exoskeleton structure comprises a snap fastener, monolithic with remaining parts of the exoskeleton structure and extending away from the sound-absorbing structure, the snap fastener being used for attaching and supporting the duct on an external structure.

11. The duct of claim 10, wherein the exoskeleton structure comprises an axial limiter, monolithic with remaining parts of the exoskeleton structure and used for limiting at least an axial movement of the duct relative to the external structure.

12. The duct of claim 1, wherein:
the tubular shape is defined by a center axis of the duct;
the exoskeleton structure is configured to retain a cross-section of the tubular shape, perpendicular to the center axis; and
the exoskeleton structure is further configured to provide bending of the duct about any axes perpendicular to the center axis.

13. The duct of claim 1, wherein the sound-absorbing structure comprises melamine foam.

14. A vehicle comprising:
an environmental control system comprising a duct, wherein the duct comprises:
an exoskeleton structure, formed using additive manufacturing and comprising an exoskeleton inner surface, the exoskeleton inner surface having a tubular shape and defining an exoskeleton interior;
a sound-absorbing structure, disposed within the exoskeleton interior and conforming to the exoskeleton inner surface, the sound-absorbing structure comprising a sound-absorbing inner surface defining a sound-absorbing interior;
an internal membrane, disposed within the sound-absorbing interior and conforming to the sound-absorbing inner surface;
an external membrane, disposed between the exoskeleton structure and the sound-absorbing structure such that the external membrane is in direct contact with the exoskeleton inner surface;
an inner-membrane fastener, wherein:
the inner-membrane fastener protrudes through the internal membrane and the sound-absorbing structure; and
the inner-membrane fastener supports the internal membrane and the sound-absorbing structure relative to the exoskeleton structure.

\* \* \* \* \*